(12) United States Patent
Kawashiri

(10) Patent No.: US 6,885,399 B1
(45) Date of Patent: Apr. 26, 2005

(54) SOLID STATE IMAGING DEVICE CONFIGURED TO ADD SEPARATED SIGNAL CHARGES

(75) Inventor: Kazuhiro Kawashiri, Miyagi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 847 days.

(21) Appl. No.: 09/588,552

(22) Filed: Jun. 7, 2000

(30) Foreign Application Priority Data

Jun. 8, 1999 (JP) .......................................... 11-161246

(51) Int. Cl.$^7$ .............................................. H04N 5/335
(52) U.S. Cl. ..................................... 348/273; 348/311
(58) Field of Search ................................ 348/273, 311, 348/294, 220.1, 216, 217; 257/232, 233, 250

(56) References Cited

U.S. PATENT DOCUMENTS

| | | | | |
|---|---|---|---|---|
| 5,287,192 A | * | 2/1994 | Iizuka ........................ 348/311 |
| 5,880,777 A | * | 3/1999 | Savoye et al. ........... 348/217.1 |
| 5,920,346 A | * | 7/1999 | Nakashiba ................ 348/315 |
| 6,185,270 B1 | * | 2/2001 | Kawamura .................. 377/61 |
| 6,198,507 B1 | * | 3/2001 | Ishigami ..................... 348/273 |
| 6,661,451 B1 | * | 12/2003 | Kijima et al. ............ 348/220.1 |
| 2002/0057354 A1 | * | 5/2002 | Yanai et al. ................ 348/273 |

* cited by examiner

Primary Examiner—Tuan Ho
Assistant Examiner—Heather R. Long
(74) Attorney, Agent, or Firm—Arent Fox PLLC

(57) ABSTRACT

A solid state image pickup device having: a vertical addition unit for adding electric charges of two or more photoelectric conversion elements on a vertical charge transfer path, by controlling read gates and the vertical charge transfer path to read electric charges from some of the plurality of photoelectric conversion elements to the vertical charge transfer path, transfer the read electric charges on the vertical charge transfer path to the downstream side in the vertical direction, and read electric charges from others of the plurality of photoelectric elements on the downstream side to the vertical charge transfer path; and a horizontal addition unit for adding electric charges transferred from two or more of the vertical charge transfer paths, on the horizontal charge transfer path, by controlling transfer gates and the horizontal charge transfer path to transfer electric charges from some of the plurality of vertical charge transfer paths to the horizontal charge transfer path, transfer the electric charges on the horizontal charge transfer path to the downstream side in the horizontal direction, and transfer electric charges from others of the plurality of vertical charge transfer paths on the downstream side to the horizontal charge transfer path.

20 Claims, 12 Drawing Sheets

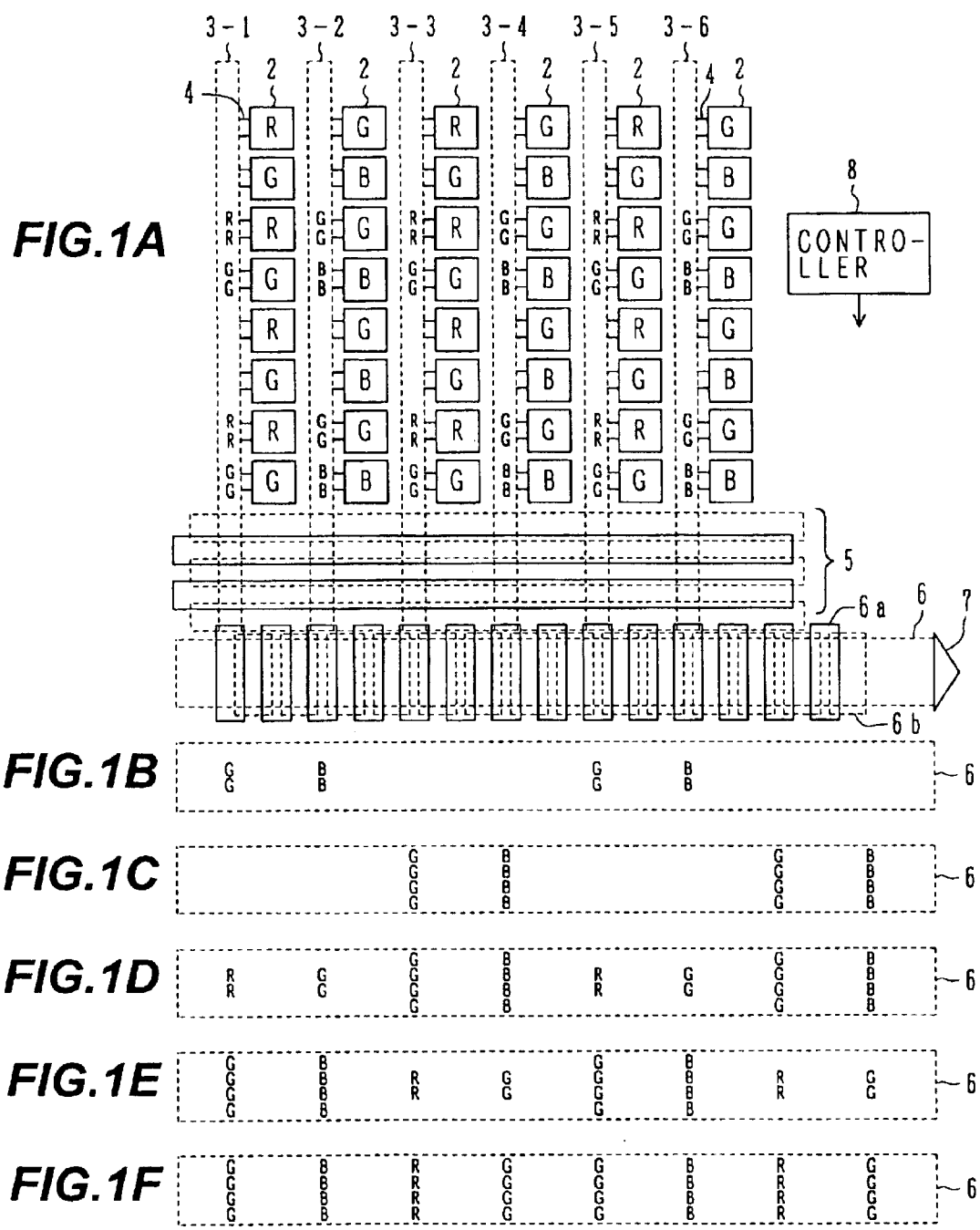

PRIOR ART

SOLID STATE IMAGING DEVICE CONFIGURED TO ADD SEPARATED SIGNAL CHARGES

This application is based on Japanese Patent Application HEI 11-161246, filed on Jun. 8, 1999, the entire contents of which are incorporated herein by reference.

BACKGROUND OF THE INVENTION a) Field of the Invention

The present invention relates to a solid state image pickup device having photoelectric conversion elements and its control method.

b) Description of the Related Art

FIG. 7 is a plan view of a general CCD type solid state image pickup device. The solid image pickup device is formed on a semiconductor substrate 1 made of silicon or the like and having a two-dimensional flat plane. The semiconductor substrate 1 has a plurality of photodiodes (photoelectric conversion elements) 2, vertical charge transfer paths (VCCD) 3, transfer gates (read gates) 4, a horizontal charge transfer path (HCCD) 6, and an output amplifier 7.

The photodiodes 2 are disposed in a two-dimensional matrix shape. Each photodiode converts received light into electric charges and stores the charges. Each vertical charge transfer path 3 is formed on the left side of each column of photodiodes 2 via transfer gates 4. The transfer gate 4 reads electric charges in the corresponding photodiode 2 to the vertical charge transfer path 3.

The vertical charge transfer path 3 is made of charge coupled devices (CCDs) and transfers electric charges read from the photodiodes 2 from the upper area of the drawing of FIG. 7 to the lower area (in a vertical direction). The horizontal charge transfer path 6 is made of CCDs, receives electric charges of one row unit transferred from the vertical charge transfer paths 3 and transfers the charges from the left area of the drawing of FIG. 7 to the right area (in a horizontal direction).

The output amplifier 7 outputs a voltage corresponding to the amount of electric charges transferred from the horizontal charge transfer path 6. This voltage value corresponds to a pixel value. Each photodiode 2 corresponds to a pixel. By disposing the photodiodes 2 two-dimensionally, signals of a two-dimensional image can be obtained.

The number of pixels of a solid state image pickup device of a recent digital camera is increasing greatly in order to improve the image quality. Digital cameras having a solid state image pickup device having a number of pixels, one million pixels or larger generally called mega pixels, are being developed. As the number of pixels of a solid state image pickup device increases, a time taken to read image signals of one frame prolongs essentially. Although a prolonged read time of image signals does not become a fatal problem in reproducing a still image, a moving image is associated with a problem that the image signal read time cannot follow the frame rate (generally 1/30 sec for NTSC signals).

As the number of pixels exceeds one million, it is difficult to read moving images at the frame rate of 1/30 sec. Therefore, a solid state image pickup device of a mega pixel order does not reproduce moving images obtained by all pixels on a display, but reduces the data amount (pixel number) to reproduce moving images so as to follow the frame rate.

SUMMARY OF THE INVENTION

It is an object of the present invention to provide a solid state image pickup device and its control method capable of reducing the image data amount without lowering a sensitivity or color balance.

According to one aspect of the present invention, there is provided a solid state image pickup device comprising: a plurality of photoelectric conversion elements for converting light into electric charges, the photoelectric conversion elements being uniformly disposed on a two-dimensional plane in vertical and horizontal directions; a plurality of vertical charge transfer paths for transferring electric charges to a downstream side in the vertical direction, the vertical charge transfer path being disposed adjacent to vertically and uniformly disposed photoelectric conversion elements; a read gate for reading electric charges from each photoelectric conversion element to the adjacent vertical charge transfer path; vertical addition means for adding electric charges of two or more photoelectric conversion elements on the vertical charge transfer path, by controlling the read gates and the vertical charge transfer path to read electric charges from some of the plurality of photoelectric conversion elements to the vertical charge transfer path, transfer the read electric charges on the vertical charge transfer path to the downstream side in the vertical direction, and read electric charges from others of the plurality of photoelectric elements on the downstream side to the vertical charge transfer path; a horizontal charge transfer path for transferring electric charges to a downstream side in the horizontal direction, the horizontal charge transfer path being disposed adjacent to one ends of the plurality of vertical charge transfer paths; a transfer gate for transferring electric charges on the vertical charge transfer paths to the horizontal charge transfer path; and horizontal addition means for adding electric charges transferred from two or more of the vertical charge transfer paths, on the horizontal charge transfer path, by controlling the transfer gate and the horizontal charge transfer path to transfer electric charges from some of the plurality of vertical charge transfer paths to the horizontal charge transfer path, transfer the electric charges on the horizontal charge transfer path to the downstream side in the horizontal direction, and transfer electric charges from others of the plurality of vertical charge transfer paths on the downstream side to the horizontal charge transfer path.

According to another aspect of the present invention, there is provided a control method for a solid state image pickup device having a plurality of photoelectric conversion elements for converting light into electric charges, the photoelectric conversion elements being uniformly disposed on a two-dimensional plane in vertical and horizontal directions, a plurality of vertical charge transfer paths for transferring electric charges to a downstream side in the vertical direction, the vertical charge transfer path being disposed adjacent to vertically and uniformly disposed photoelectric conversion elements, a horizontal charge transfer path for transferring electric charges to a downstream side in the horizontal direction, the horizontal charge transfer path being disposed adjacent to one ends of the plurality of vertical charge transfer paths, the method comprising the steps of: (a) reading electric charges from some of the plurality of photoelectric conversion elements to the vertical charge transfer path; (b) transferring the electric charges on the vertical charge transfer path to a downstream side in the vertical direction; (c) reading electric charges from others of the plurality of photoelectric conversion elements on the downstream side to the vertical charge transfer path and adding the read electric charges to the electric charges transferred to the downstream side; (d) transferring electric charges from some of the plurality of vertical charge transfer paths to the horizontal charge transfer path; (e) transferring the electric charges on the horizontal charge transfer path to a downstream side in the horizontal direction; and (f) transferring electric charges from others of the plurality of vertical charge transfer paths on the downstream side to the horizontal charge transfer path and adding electric charges from two or more vertical charge transfer paths on the horizontal charge transfer path.

The vertical charge transfer path adds electric charges of two or more photoelectric conversion elements, and the horizontal charge transfer path also adds electric charges transferred from two or more vertical charge transfer paths. Since electric charges of four or more photoelectric conversion elements in total, can be added together, the image data amount can be reduced.

Electric charges of photosensitive conversion elements not only in the vertical direction but also in the horizontal direction are added for pixel mixing. It is therefore possible to reduce the pixel data amount, improve a sensitivity, and obtain reduced image data having a good color balance.

BRIEF DESCRIPTION OF THE DRAWINGS

FIG. 1A is a partial plan view of a color solid state image pickup device according to an embodiment of the invention, and FIGS. 1B to 1F are timing charts illustrating a transfer and addition operation of signal charges on a horizontal charge transfer path.

DETAILED DESCRIPTION OF THE PREFERRED EMBODIMENTS

Figure 7:
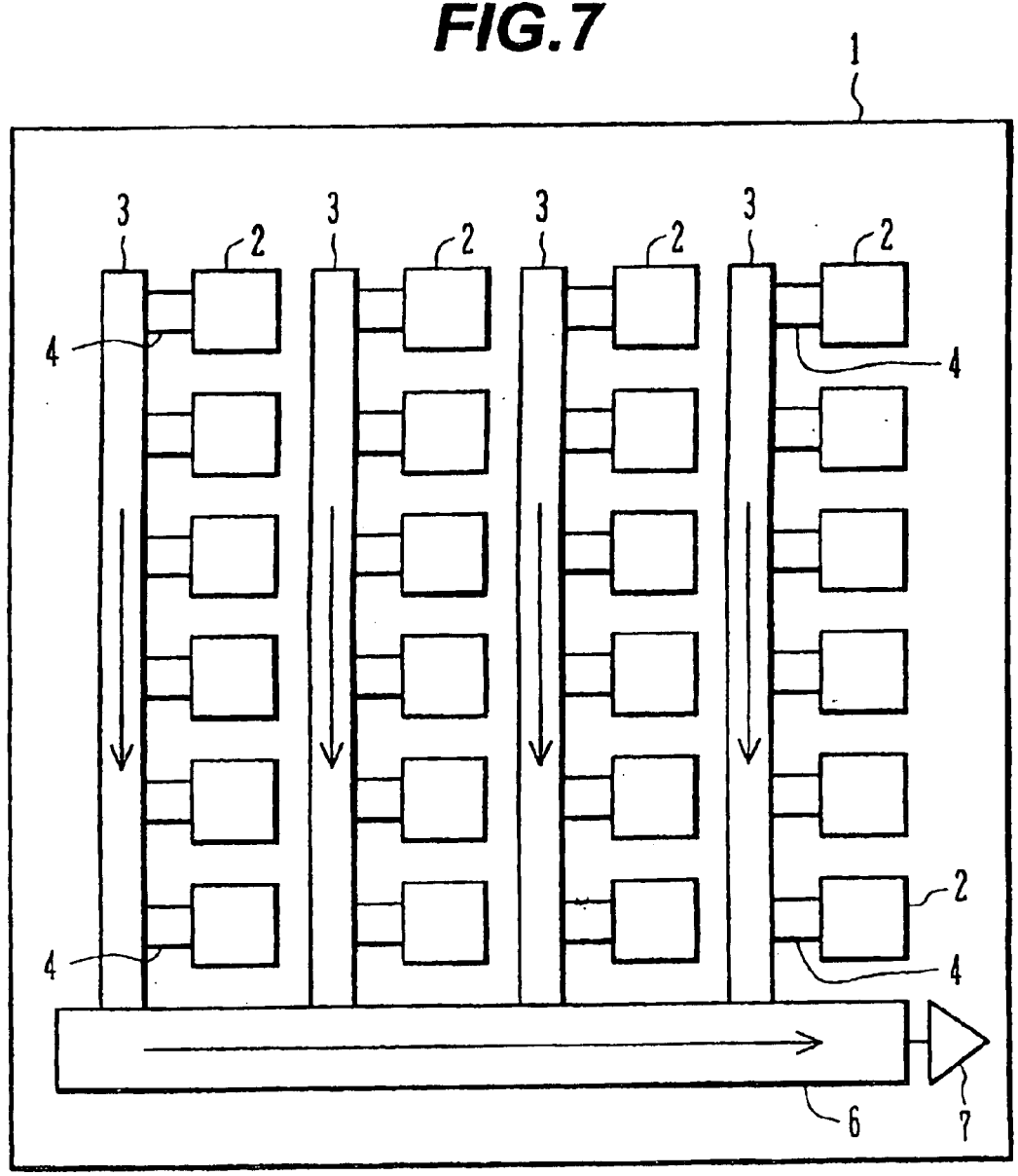
FIG. 7 is a plan view showing the fundamental structure of a solid state image pickup device.

FIG. 1A is a partial plan view showing a color solid state image pickup device according to an embodiment of the invention, and FIGS. 1B to 1F are timing charts illustrating a transfer and addition operation of signal charges on a horizontal charge transfer path 6. The fundamental structure of the solid state image pickup device of this embodiment is similar to that shown in FIG. 7, including photodiodes 2, vertical charge transfer paths 3-1 to 3-6, transfer gates 4, a horizontal charge transfer path 6 and an output amplifier 7. A control unit 8 controls the solid state image pickup device.

Control electrodes 5 control the read (transfer) operation of electric charges from the vertical charge transfer paths 3-1 to 3-6 to the horizontal charge transfer path 6. First transfer electrodes 6b indicated by broken lines are formed over the horizontal charge transfer path 6 via an insulating film, and second transfer electrodes 6a indicated by solid lines are formed over the first transfer electrodes 6b via another insulating film. By applying two-phase transfer pulses to the electrodes 6a and 6b, electric charges are transferred along the horizontal charge transfer path 6 from left to right (in a horizontal direction).

A color filter layout of photodiodes (pixels) 2 shown in FIG. 1A is the Bayer matrix. R represents a red pixel, G represents a green pixel, and B represents a blue pixel. Each of the vertical charge transfer paths 3-1 to 3-6 or all of them are called, where applicable, simply a vertical charge transfer path 3.

Figure 2A:
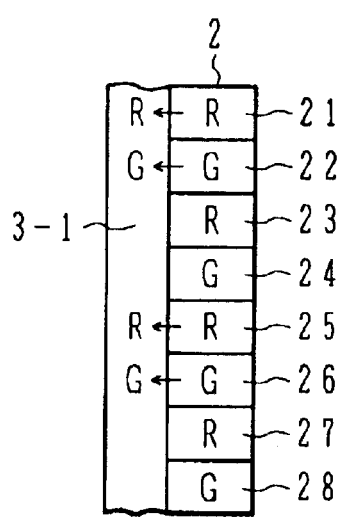
FIGS. 2A to 2C are schematic plan views illustrating a read and addition operation of signal charges on a vertical charge transfer path of a color solid state image pickup device according to an embodiment of the invention.
Figure 2B:
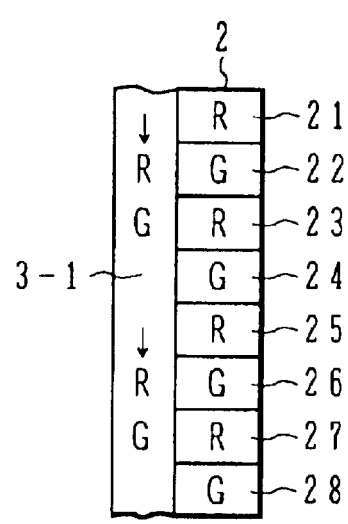
Figure 2C:
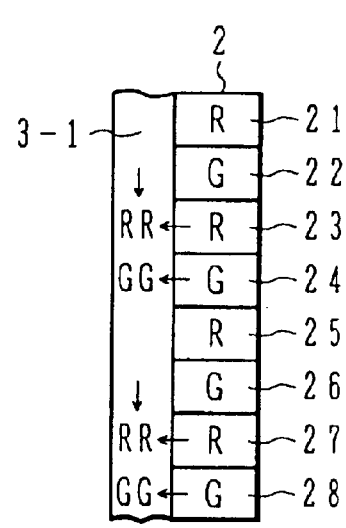

A method of reducing a data amount through addition of pixel values in a vertical direction will be described with reference to FIGS. 2A to 2C showing one vertical charge transfer path 3-1. As shown in FIG. 2A, electric charges are read from an R pixel photodiode 21, from a G pixel photodiode 22 at the next lower row, from an R pixel photodiode 25 at the third lower row, and from a G pixel photodiode 26 at the next lower row. Namely, electric charges are read from a pair of upper and lower adjacent R and G photodiodes and from a pair of upper and lower adjacent R and G photodiodes spaced by two rows from the first pair, via transfer gates 4 to the vertical charge transfer path 3-1.

Next, as shown in FIG. 2B, the electric charges R and G on the vertical charge transfer path 3-1 are transferred downwards by one row. Then, as shown in FIG. 2C, the electric charges are transferred further downwards by one row. At this timing shown in FIG. 2C, electric charges not read at the timing shown in FIG. 2A are read from an R pixel photodiode 23, from a G pixel photodiode 24 at the next lower row, from an R pixel photodiode 27 at the third lower row, and from a G pixel photodiode 28 at the next lower row, respectively to the vertical charge transfer path 3-1. Namely, electric charges are read from a pair of upper and lower adjacent R and G photodiodes and from a pair of upper and lower adjacent R and G photodiodes spaced by two rows from the first pair, via transfer gates 4 to the vertical charge transfer path 3-1.

Therefore, the electric charges R and G transferred from the upper rows are added to (mixed with) the electric charges R and G on the vertical charge transfer path 3-1. The added charges are represented by RR and GG. Electric charges for blue pixels are added in a similar manner and are represented by BB as shown in FIG. 1A. Two pixels adjacent in the vertical direction for each color are added and the number of pixels in the vertical direction is halved.

By repeating the charge read and transfer operation in the vertical direction, electric charges of two pixels (photodiodes) of the same color separated by two rows in the vertical direction are added together, and transferred on the vertical charge transfer path 3 as vertically added two-pixel electric charges RR, GG and BB. This means that the pixel data amount is halved substantially in the vertical direction.

Next, the operation of adding the vertically added two-pixel electric charges also in the horizontal direction to further reduce the pixel data amount will be described with reference to FIGS. 1B to 1F.

FIGS. 1B to 1F time sequentially illustrate the charge transfer on the horizontal charge transfer path 6.

At the timing shown in FIG. 1B, the vertically added two-pixel electric charges GG and BB on the vertical charge transfer paths 3-1 to 3-6 at the lowest row are read to the horizontal charge transfer path 6. At this timing, as shown in FIG. 1B, although the vertically added two-pixel electric charges GG and BB are read from the vertical charge transfer paths 3-1, 3-2, 3-5 and 3-6, the vertically added two-pixel electric charges GG and BB are not read from the vertical charge transfer paths 3-3 and 3-4 between the vertical charge transfer paths 3-1, 3-2, 3-5 and 3-6.

More specifically, electric charges are read from a pair of two columns of the vertical charge transfer paths 3 and a pair of two columns spaced by two columns from the first pair. This selective read is controlled by the control electrodes 5. The details of the control electrodes 5 will be given later with reference to FIG. 3 and FIGS. 4A to 4C.

Next, the vertically added two-pixel electric charges GG and BB read at the timing shown in FIG. 1B are transferred by two columns (two vertical charge transfer paths) in the horizontal direction. At this timing, the vertically added two-pixel electric charges GG and BB on the vertical charge transfer paths 3-3 and 3-4 at the lowest row not read at the timing shown in FIG. 1B are read to the horizontal charge transfer path 6. Therefore, as shown in FIG. 1C, the vertically added two-pixel electric charges GG and BB transferred in the horizontal direction are added to the vertically added two-pixel electric charges GG and BB read from the vertical charge transfer paths 3-3 and 3-4 to become GGGG and BBBB. In this manner, pixels of two pairs of two columns in the horizontal direction are added, i.e., four pixels are added.

Next, electric charges on the vertical charge transfer paths 3-1 to 3-6 are transferred downwards by one row in the vertical direction, so that vertically added two-pixel electric charges RR and GG are positioned at the lowest row of the vertical charge transfer paths. Thereafter, as shown in FIG. 1D, the vertically added two-pixel electric charges RR and GG are read from the vertical charge transfer paths 3-1, 3-2, 3-5 and 3-6 to the horizontal charge transfer path 6.

Next, the electric charges on the horizontal charge transfer path 6 are transferred by two columns in the horizontal direction, as shown in FIG. 1E.

Electric charges on the vertical charge transfer paths 3-3 and 3-4 not read at the timing shown in FIG. 1D are transferred downwards in the vertical direction, so that vertically added two-pixel electric charges RR and GG are positioned at the lowest row of the vertical charge transfer paths. The vertically added two-pixel electric charges RR and GG on the vertical charge transfer paths 3-3 and 3-4 at the lowest row are read to the horizontal charge transfer path 6. Therefore, as shown in FIG. 1F, the vertically added two-pixel electric charges RR and GG transferred in the horizontal direction are added to the vertically added two-pixel electric charges RR and GG read from the vertical charge transfer paths 3-3 and 3-4 to become RRRR and GGGG.

As shown in FIG. 1F, the added electric charges of four pixels for each color disposed efficiently on the horizontal charge transfer path 6 are transferred right in the horizontal direction, and the output amplifier 7 outputs pixel signals of substantially four rows. Thereafter, the above-described operations are repeated to output pixel signals of one frame.

This means that the pixel data amount is substantially halved both in the vertical and horizontal directions and the total pixel data amount is reduced by ¼. Since data of a plurality of pixels is added, the sensitivity can be improved substantially. As compared to reducing the pixel data amount by thinning pixel data, the information amount is larger and the image quality can be improved more.

In the embodiment described with reference to FIGS. 1A to 1F and FIGS. 2A to 2C, electric charges are added for two rows in the vertical direction and two columns in the horizontal direction. The numbers of rows and columns in the vertical and horizontal directions are not limited only to two, but three or more rows and columns may be used in the vertical and horizontal directions to further reduce the data amount. In this case, a similar method described above can be used basically by changing the read timings.

Figure 3:
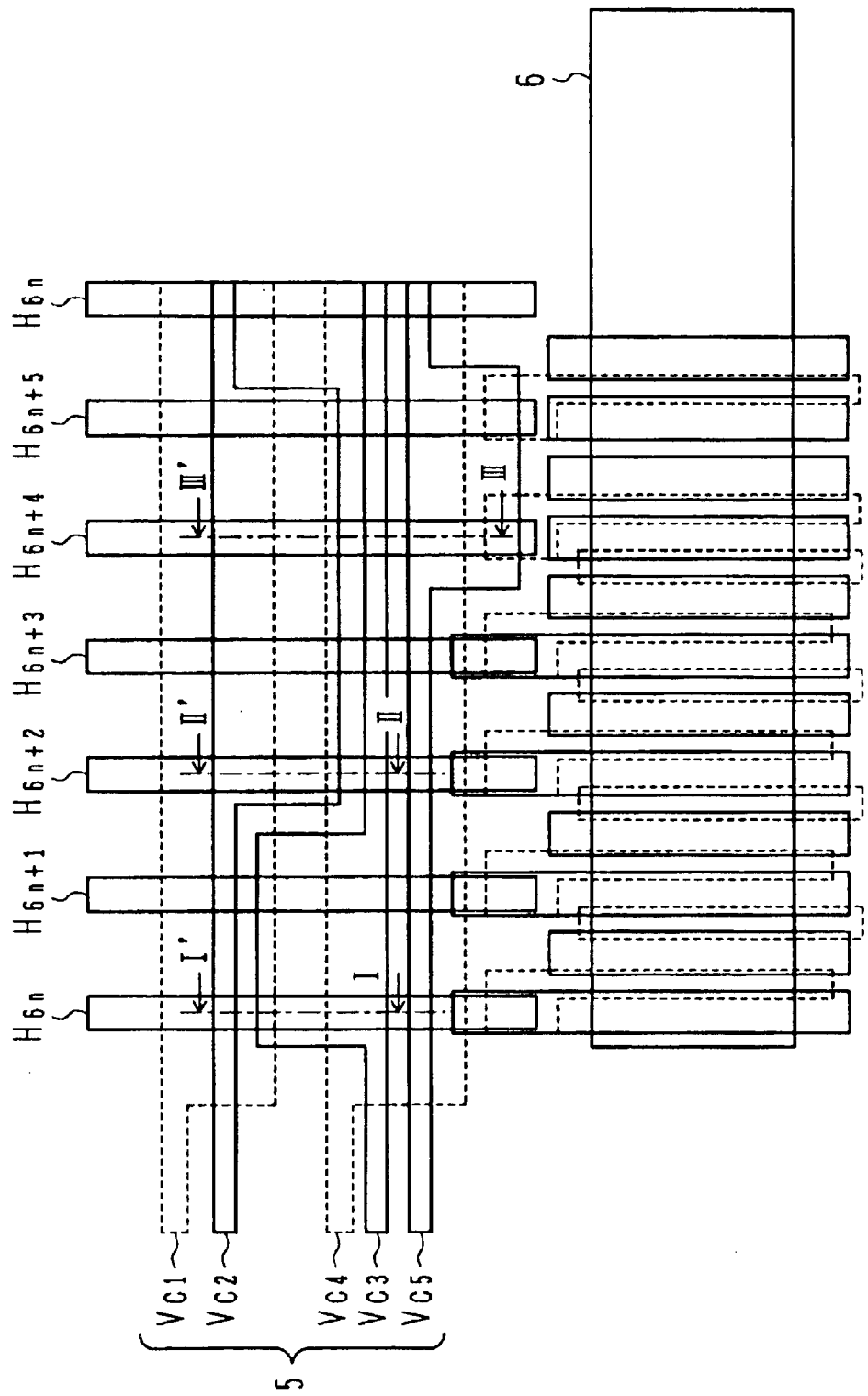
FIG. 3 is a plan view showing the structure of control electrodes of a color solid state image pickup device according to an embodiment of the invention.

The selective read of electric charges from the vertical charge transfer paths 3-1 to 3-6 to the horizontal charge transfer path 6 can be controlled by the control electrodes 5. FIG. 3 is a plan view showing an example of the structure of control electrodes 5 used for addition of electric charges of three columns in the horizontal direction.

Figure 4A:
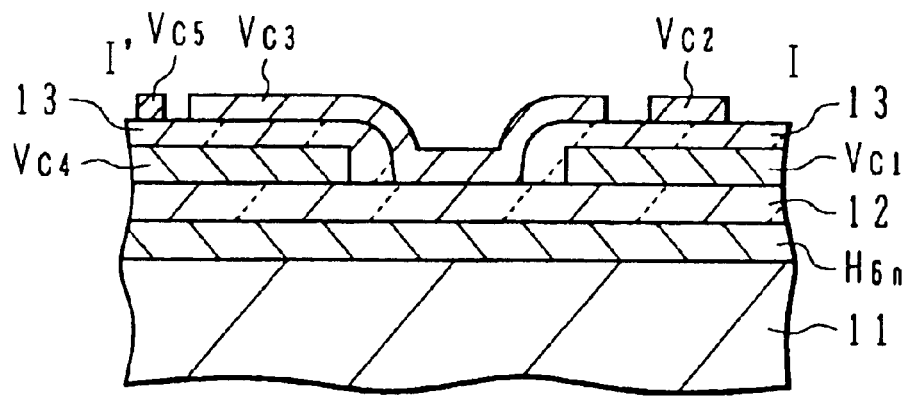
FIGS. 4A to 4C are cross sectional views showing the structure of the control electrodes of the color solid state image pickup device of the embodiment.
Figure 4B:
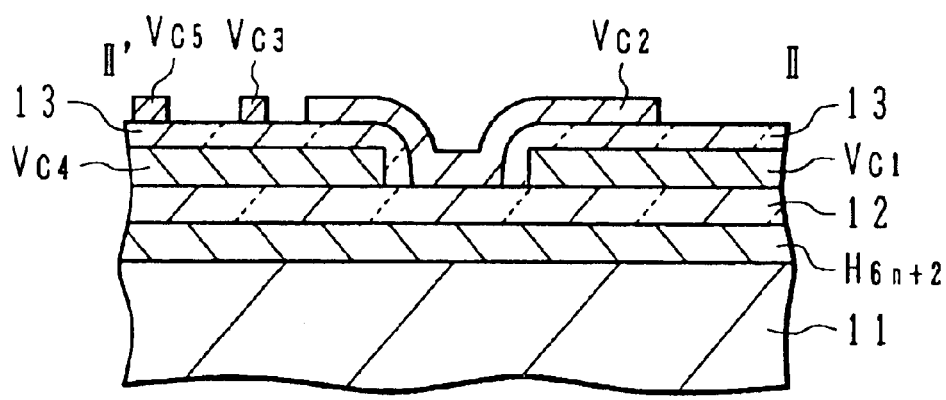
Figure 4C:
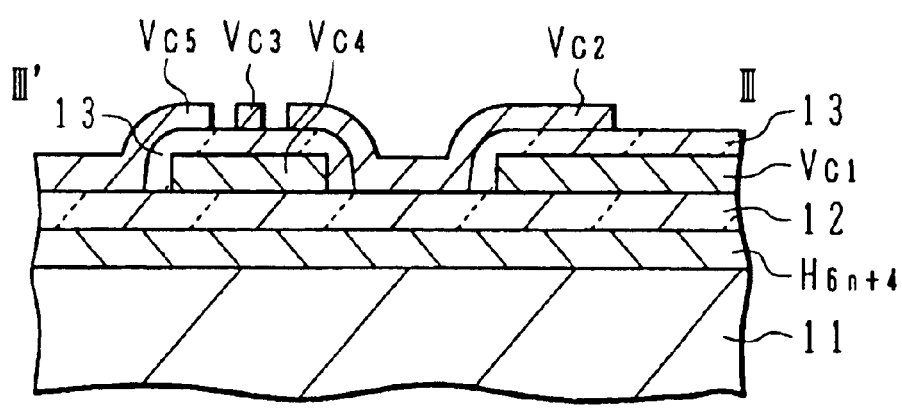

FIG. 4A is a cross sectional view taken along line I–I' of FIG. 3, FIG. 4B is a cross sectional view taken along line II–II' of FIG. 3, and FIG. 4C is a cross sectional view taken along line III–III' of FIG. 3.

Referring to FIG. 3, $H_{6n}$, $H_{6n+1}$, $H_{6n+2}$, $H_{6n+3}$, $H_{6n+4}$, and $H_{6n+5}$ represent a vertical charge transfer path (n-type semiconductor region in a p-type semiconductor region 11 shown in FIGS. 4A to 4C), and reference numeral 6 represents a horizontal charge transfer path. First polysilicon layer electrodes $V_{c1}$ and $V_{c4}$ indicated by broken lines are formed over the vertical charge transfer paths via an insulating film ($SiO_2$) 12, and second polysilicon layer electrodes $V_{c2}$, $V_{c3}$ and $V_{c5}$ indicated by solid lines are formed over the first polysilicon layer electrodes $V_{c1}$ and $V_{c4}$ via an insulating film ($SiO_2$) 13. These five electrodes $V_{c1}$ to $V_{c5}$ constitute the control electrodes 5. A transfer control signal of either a high or low level is supplied from the control unit 8 (FIG. 1A) to these control electrodes to select the vertical charge transfer paths $H_{6n}$, $H_{6n+1}$, $H_{6n+2}$, $H_{6n+3}$, $H_{6n+4}$, and $H_{6n+5}$ and read (transfer) electric charges from the selected vertical charge transfer paths to the horizontal charge transfer path 6. One unit of the vertical charge transfer paths $H_{6n}$, $H_{6n+1}$, $H_{6n+2}$, $H_{6n+3}$, $H_{6n+4}$, and $H_{6n+5}$ is disposed repetitively along the horizontal direction in FIG. 3.

FIG. 4A is a cross sectional view showing the control electrodes along the vertical charge transfer path $H_{6n}$. The electrodes $V_{c1}$, $V_{c3}$ and $V_{c4}$ are disposed on the insulating film 12 over the vertical charge transfer path $H_{6n}$, in this order sequentially from the upper area to lower area (downwards in the vertical direction) in FIG. 3. The structures of the vertical charge transfer path $H_{6n+1}$ and control electrodes over this path have the same structures as the vertical charge transfer path $H_{6n}$ and control electrodes over this path. The electrode $V_{c5}$ is disposed on the insulating film 13 over the electrode $V_{c4}$.

FIG. 4B is a cross sectional view showing the control electrodes along the vertical charge transfer path $H_{6n+2}$. The electrodes $V_{c1}$, $V_{c2}$ and $V_{c4}$ are disposed on the insulating film 12 over the vertical charge transfer path $H_{6n+2}$, in this order sequentially from the upper area to lower area (downwards in the vertical direction) in FIG. 3. The structures of the vertical charge transfer path $H_{6n+3}$ and control electrodes over this path have the same structures as the vertical charge transfer path $H_{6n}+2$ and control electrodes over this path. The electrodes $V_{c3}$ and $V_{c5}$ are disposed on the insulating film 13 over the electrode $V_{c4}$.

FIG. 4C is a cross sectional view showing the control electrodes along the vertical charge transfer path $H_{6n+4}$. The electrodes $V_{c1}$, $V_{c2}$, $V_{c4}$, $V_{c3}$ and $V_{c5}$ are disposed on the insulating film 12 over the vertical charge transfer path $H_{6n+4}$, in this order sequentially from the upper area to lower area (downwards in the vertical direction) in FIG. 3. The structures of the vertical charge transfer path $H_{6n+5}$ and control electrodes over this path have the same structures as the vertical charge transfer path $H_{6n+4}$ and control electrodes over this path. The electrode $V_{c3}$ is disposed on the insulating film 13 over the electrode $V_{c4}$.

For addition of electric charges of two columns in the horizontal direction described with FIG. 1A, one unit of vertical charge transfer paths $H_{6n}$, $H_{6n+1}$, $H_{6n+4}$ and $H_{6n+3}$ is disposed repetitively in the horizontal direction in FIG. 3.

Addition of electric charges of two columns in the horizontal direction will be described with reference to FIG. 5 and FIGS. 6A and 6B.

Figure 5:
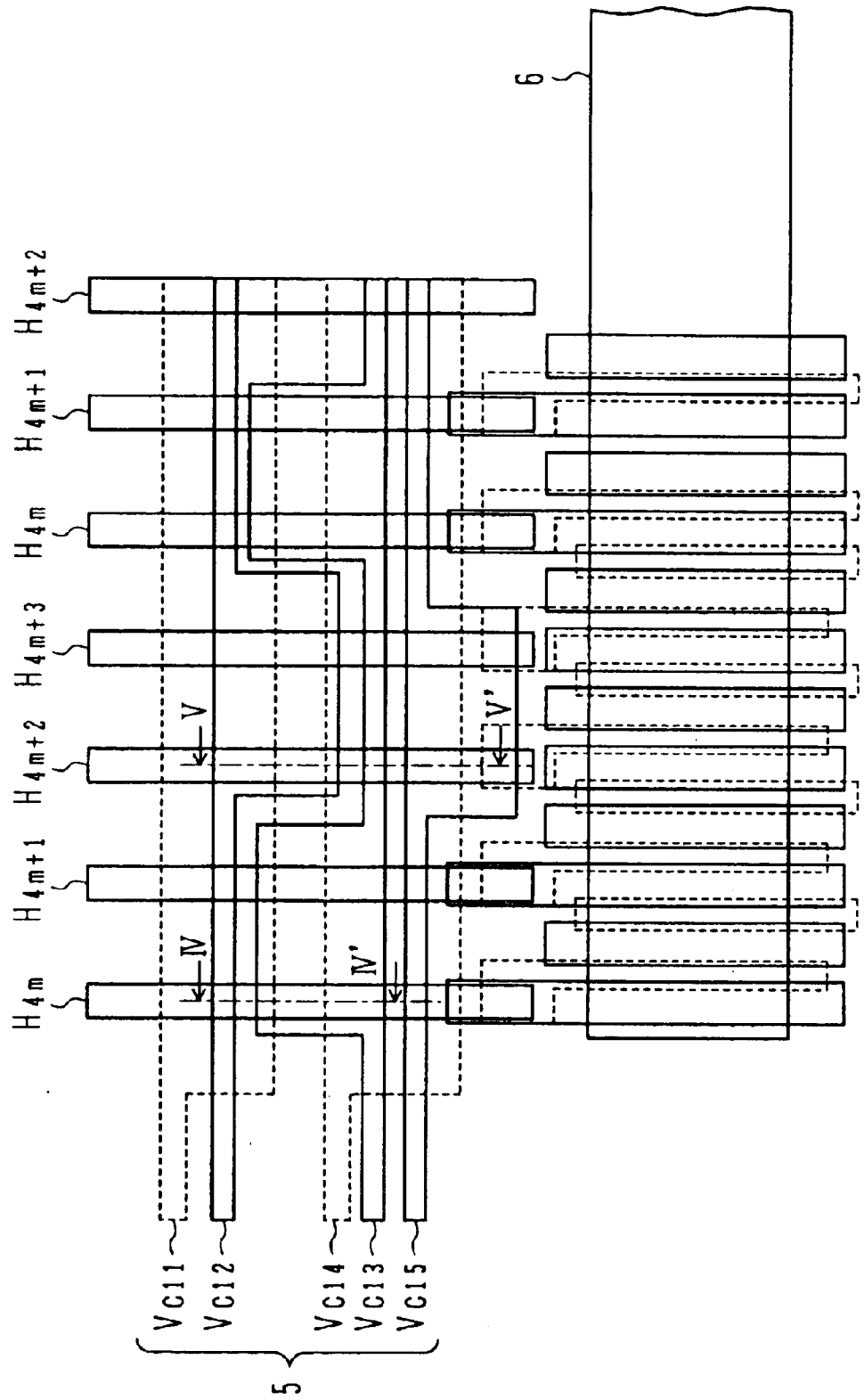
FIG. 5 is a plan view showing the structure of control electrodes of a color solid state image pickup device according to another embodiment of the invention.

FIG. 5 is a plan view showing an example of the structure of control electrodes 5 used for addition of electric charges of two columns in the horizontal direction.

Figure 6A:
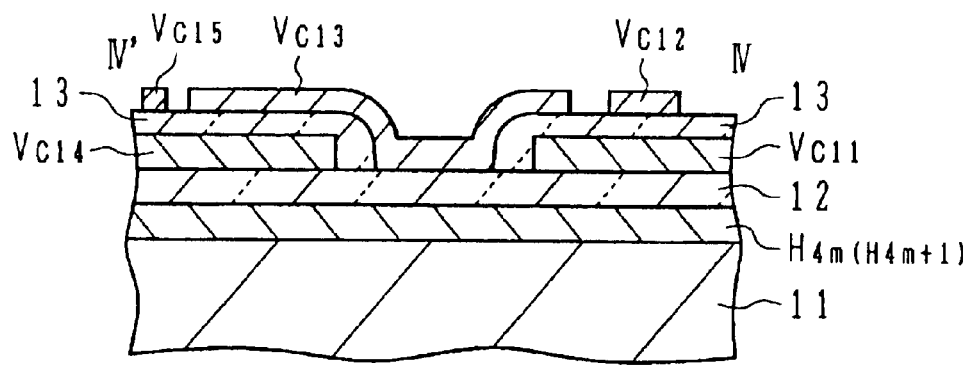
FIGS. 6A and 6B are cross sectional views showing the structure of the control electrodes of the color solid state image pickup device of the embodiment.
Figure 6B:
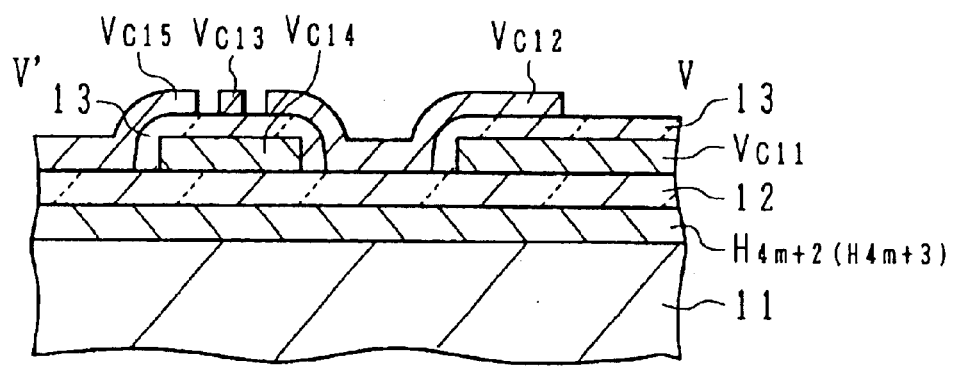

FIG. 6A is a cross sectional view taken along line IV–IV' of FIG. 5, and FIG. 6B is a cross sectional view taken along line V–V' of FIG. 5.

Referring to FIG. 5, $H_{4m}$, $H_{4m+1}$, $H_{4m+2}$ and $H_{4m+3}$ represent a vertical charge transfer path (n-type semiconductor region in a p-type semiconductor region 11 shown in FIGS. 6A and 6B), and reference numeral 6 represents a horizontal charge transfer path. First polysilicon layer electrodes $V_{c11}$ and $V_{c14}$ indicated by broken lines are formed over the vertical charge transfer paths via an insulating film ($SiO_2$) 12, and second polysilicon layer electrodes $V_{c12}$, $V_{c13}$ and $V_{c15}$ indicated by solid lines are formed over the first polysilicon layer electrodes $V_{c11}$ and $V_{c14}$ via an insulating film ($SiO_2$) 13. These five electrodes $V_{c11}$ to $V_{c15}$ constitute the control electrodes 5. A transfer control signal of either a high or low level is supplied from the control unit 8 (FIG. 1A) to these control electrodes to select the vertical charge transfer paths $H_{4m}$, $H_{4m+1}$, $H_{4m+2}$, and $H_{4m+3}$ and read (transfer) electric charges from the selected vertical charge transfer paths to the horizontal charge transfer path 6. One unit of the vertical charge transfer paths $H_{4m}$, $H_{4m+1}$, $H_{4m+2}$ and $H_{4m+3}$ is disposed repetitively along the horizontal direction in FIG. 5.

FIG. 6A is a cross sectional view showing the control electrodes along the vertical charge transfer path $H_{4m}$. The electrodes $V_{c11}$ $V_{c13}$ and $V_{c14}$ are disposed on the insulating film 12 over the vertical charge transfer path $H_{4m}$, in this order sequentially from the upper area to lower area (downwards in the vertical direction) in FIG. 5. The structures of the vertical charge transfer path $H_{4m+1}$ and control electrodes over this path have the same structures as the vertical charge transfer path $H_{4m}$ and control electrodes over this path.

FIG. 6B is a cross sectional view showing the control electrodes along the vertical charge transfer path $H_{4m+2}$. The electrodes $V_{c11}$, $V_{c12}$, $V_{c14}$ and $V_{c15}$ are disposed on the insulating film 12 over the vertical charge transfer path $H_{4m+2}$, in this order sequentially from the upper area to lower area (downwards in the vertical direction) in FIG. 5. The structures of the vertical charge transfer path $H_4$ m+$_3$ and control electrodes over this path have the same structures as the vertical charge transfer path $H_{4m+2}$ and control electrodes over this path.

Figure 8:
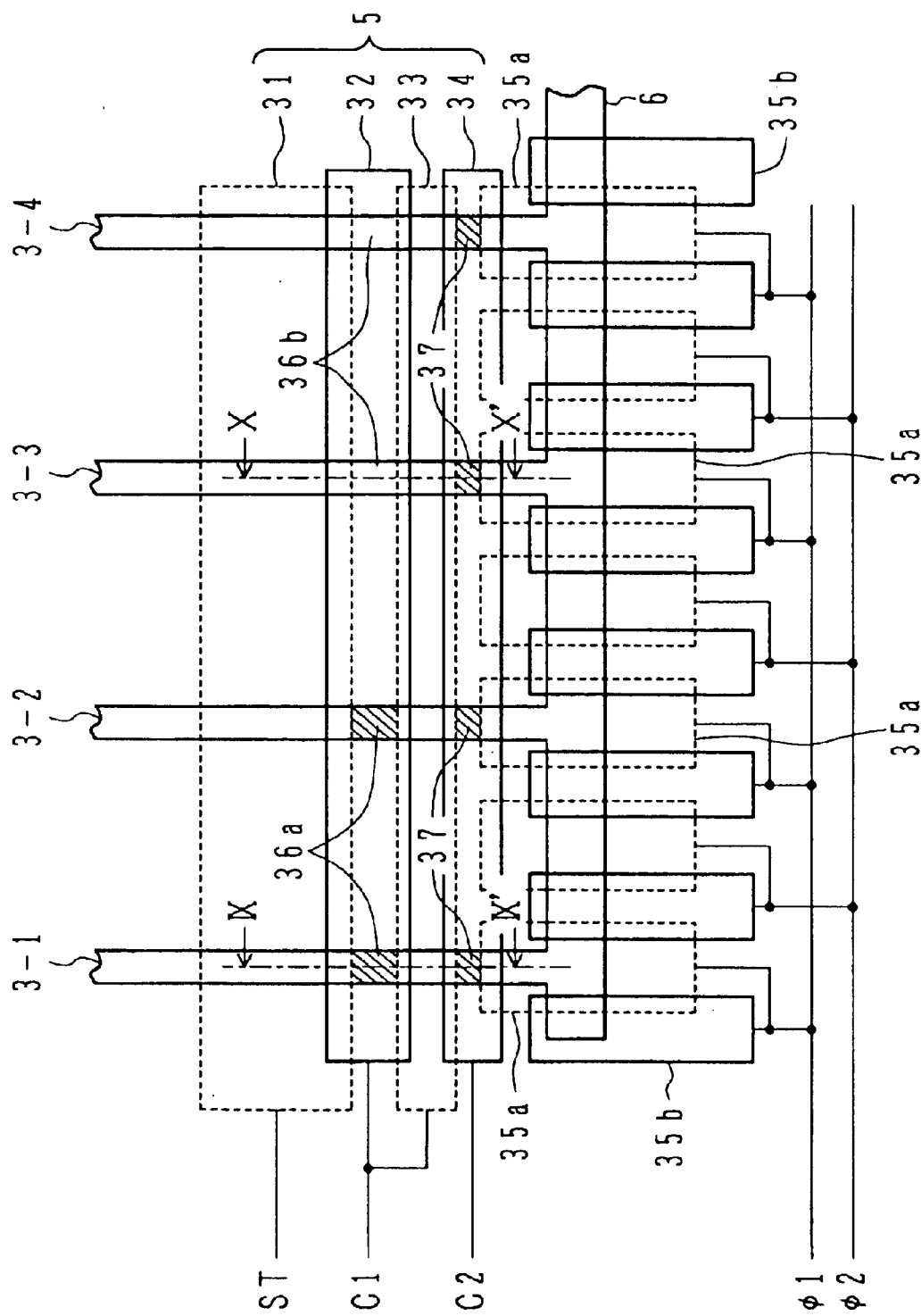
FIG. 8 is a plan view showing the structure of control electrodes of a color solid state image pickup device according to another embodiment of the invention.

FIG. 8 is a plan view showing another example of the structure of control electrodes 5 shown in FIG. 1A. FIGS. 9A to 9E are cross sectional views taken along lines IX–IX' of FIG. 8. FIGS. 10A to 10E are cross sectional views taken along line X–X' of FIG. 8. Electrodes 31 to 34 correspond to the control electrodes.

Figure 9A:
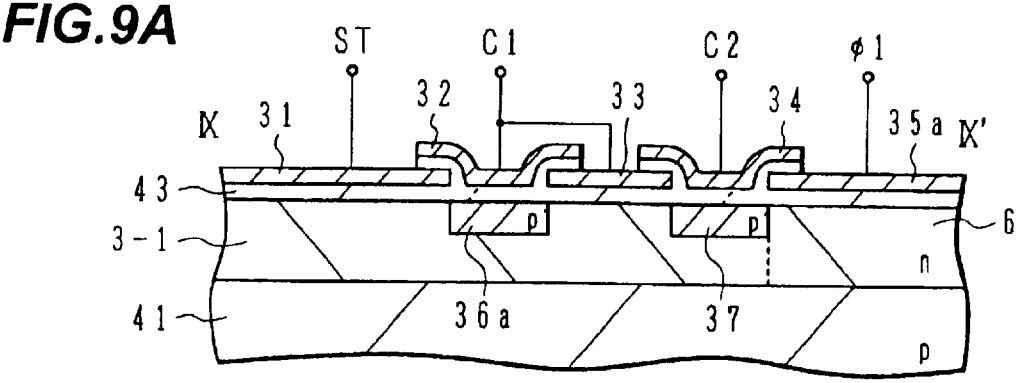
FIGS. 9A to 9E are a cross sectional view taken along line 1X–1X' of FIG. 8 and potential diagrams.
Figure 10A:
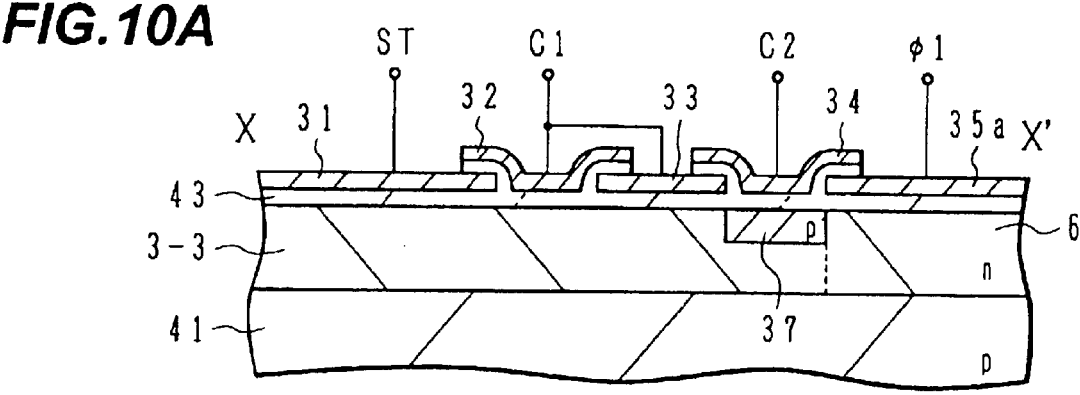
FIGS. 10A to 10E are a cross sectional view taken along line X–X' of FIG. 8 and potential diagrams.

As shown in FIGS. 9A and 10A, vertical charge transfer paths 3-1 to 3-4 and a horizontal charge transfer path 6 are made of n-type semiconductor regions in a p-type semiconductor region 41. First polysilicon (electrode) layers 31, 33 and 35a are formed on an insulating film 43 over semiconductor regions 3 and 6.

In the vertical charge transfer paths 3-1 and 3-2, p-type impurity ions such as B are implanted into a semiconductor region 36a under an area between the first polysilicon layers 31 and 33. The p-type region 36a can be formed by self-alignment ion implantation using the first polysilicon layers 31 and 33 as a mask.

In all the vertical charge transfer paths 3-1 to 3-4, p-type impurity ions are implanted into a semiconductor region 37 under an area between the first polysilicon layers 33 and 35a. The p-type region 37 can be formed by self-alignment ion implantation using the first polysilicon layers 33 and 35a as a mask.

Thereafter, second polysilicon (electrode) layers 32, 34 and 35b are formed on an insulating film 43 over the semiconductor regions 36 and 37 and first polysilicon layers 31, 33 and 35a.

A signal ST is applied to the electrode 31, a signal C1 is applied to the electrodes 32 and 33, a signal C2 is applied to the electrode 34. Two-phase drive pulses $\phi 1$ and $\phi 2$ are applied to the electrodes 35a and 35b. In the horizontal charge transfer path 6, the semiconductor region under the electrode 35a is an n-type well region, and the semiconductor region under the electrode 35b is a p-type barrier region (or low concentration n-type barrier layer).

A method of transferring the charges only in the vertical charge transfer paths 3-1 and 3-2 to the horizontal charge transfer path 6 and maintaining the charges on the vertical charge transfer paths 3-3 and 3-4 will be described.

Figure 9B:
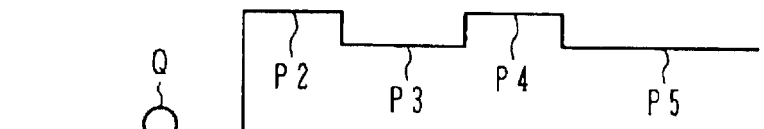
Figure 10B:
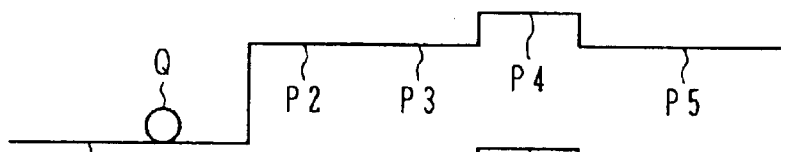

In FIGS. 9A and 10A, the signal ST is set to a positive potential, the signal C1 is set to 0 V, the signal C2 is set to 0 V, and the signal $\phi 1$ is set to 0V. As shown in FIGS. 9B and 10B, the potentials at the semiconductor regions under the electrodes 31, 32, 33, 34 and 35a therefore become P1, P2, P3, P4 and P5.

The vertical charge transfer path 3-1 shown in FIG. 9A has the p-type region 36a. Therefore, the potential P2 at the vertical charge transfer path 3-1 becomes higher than the potential P2 at the vertical charge transfer path 3-3 shown in FIG. 10A. The other parameters are the same for both the vertical charge transfer paths 3-1 and 3-3. As the signal ST is changed to the positive potential, the charges Q in the vertical charge transfer path 3 are accumulated in the region having the potential P1, as shown in FIGS. 9B and 10B.

Figure 9C:
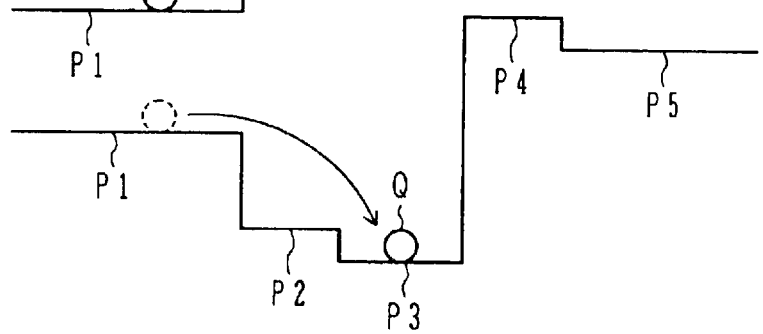
Figure 10C:
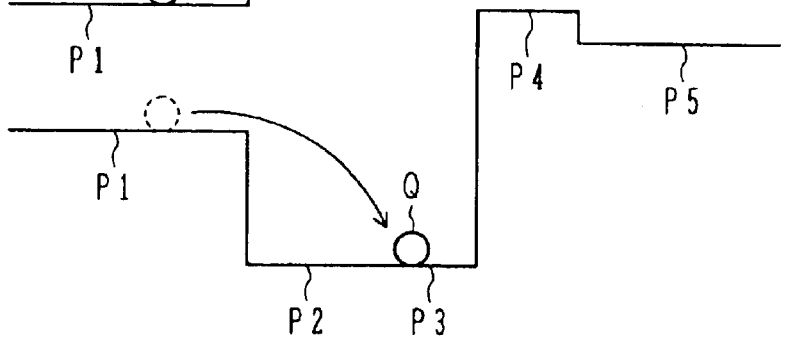

Next, as the signal C1 is changed to the positive potential, as shown in FIG. 9C the charges Q in the region at the potential P1 move via the region at the potential P2 to the region at the potential P3. As shown in FIG. 10C, in the vertical charge transfer path 3-3, the charges Q in the region at the potential P1 are moved to the regions at the potentials P2 and P3.

Figure 9D:
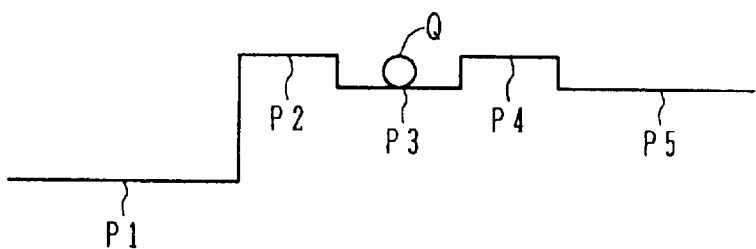
Figure 10D:
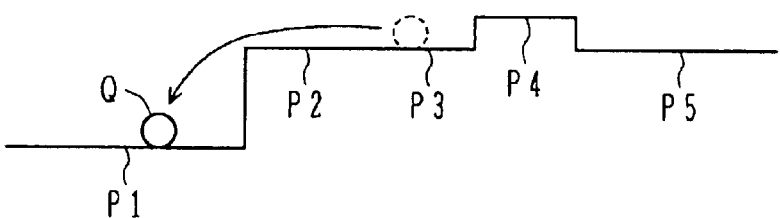

Next, the signal C1 is set to 0 V. As shown in FIG. 9D, in the vertical charge transfer path 3-1, the charges Q are stored in the region at the potential P3. As shown in FIG. 10D, in the vertical charge transfer path 3-3, the charges Q in the regions at the potentials P2 and P3 are returned to the region at the potential P1.

Figure 9E:
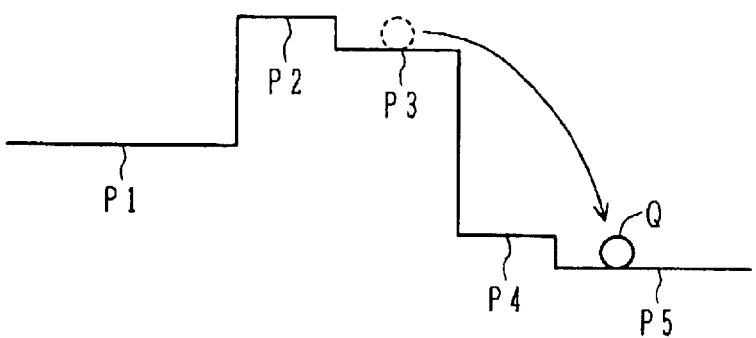
Figure 10E:
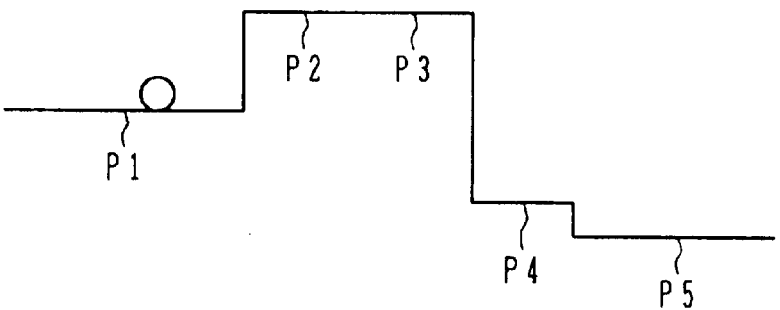

Next, the signal C2 and signal φ1 are changed to the positive potential. As shown in FIG. 9E, in the vertical charge transfer path 3-1, the charges in the region at the potential P3 are moved via the region at the potential P4 to the horizontal charge transfer path 6 at the potential P5. As shown in FIG. 10E, in the vertical charge transfer path 3-3, the charges Q are stored in the vertical charge transfer path 3-3 at the potential P1.

The vertical charge transfer paths 3-2 and 3-4 shown in FIG. 1A correspond to the vertical charge transfer paths 3-1 and 3-3 described above. With this control method described above, the charges only in the vertical charge transfer paths 3-1 and 3-2 can be transferred to the horizontal charge transfer path 6, and the charges in the vertical charge transfer paths 3-3 and 3-4 are not transferred.

Next, a method of transferring the charges in the vertical charge transfer paths 3-3 and 3-4 to the horizontal charge transfer path 6 as described with FIG. 1C will be described with reference to FIGS. 11A to 11D.

Figure 11A:
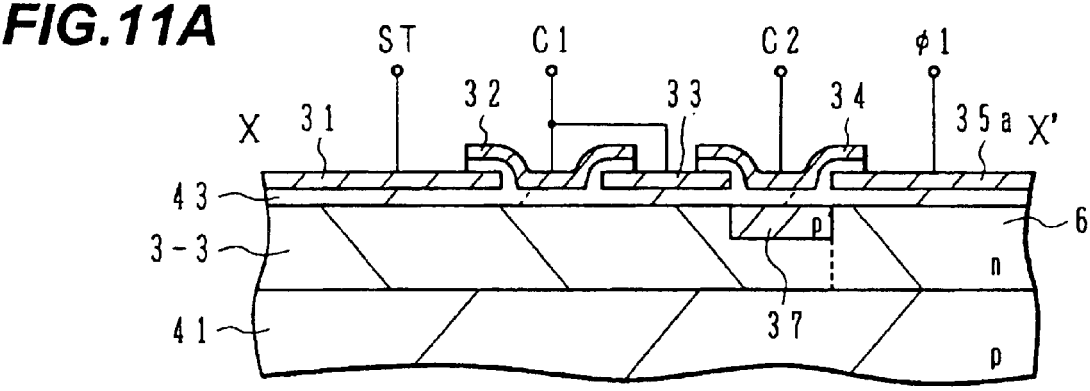
FIGS. 11A to 11D are a cross sectional view taken along line X–X' of FIG. 8 and potential diagrams.

FIG. 11A is a cross sectional view taken along line X–X' of FIG. 8, similar to FIG. 10A.

Figure 11B:
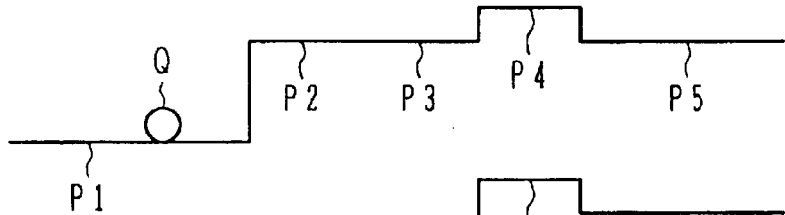

In FIG. 11A, the signal ST is set to a positive potential, the signal C1 is set to 0 V, the signal C2 is set to 0 V, and the signal φ1 is set to 0V. Similar to FIG. 10B, as shown in FIG. 11B the potentials at the semiconductor regions under the electrodes 31, 32, 33, 34 and 35a therefore become P1, P2, P3, P4 and P5. As the signal ST is changed to the positive potential, the charges in the vertical charge transfer path 3-3 are accumulated in the region at the potential P1.

Figure 11C:
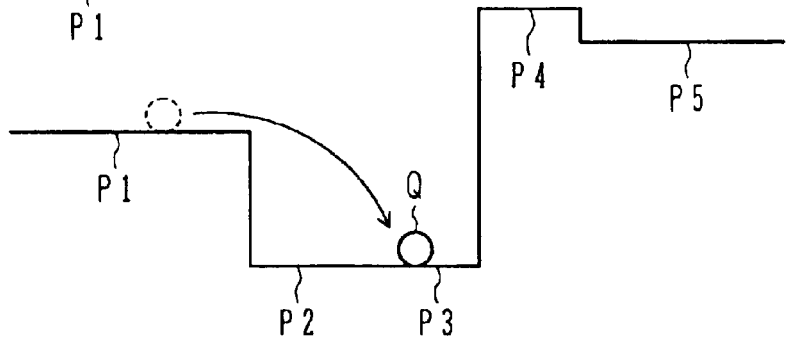

As the signal C1 is changed to the positive potential, as shown in FIG. 11C the charges in the region at the potential P1 are moved to the regions at the potentials P2 and P3.

Figure 11D:
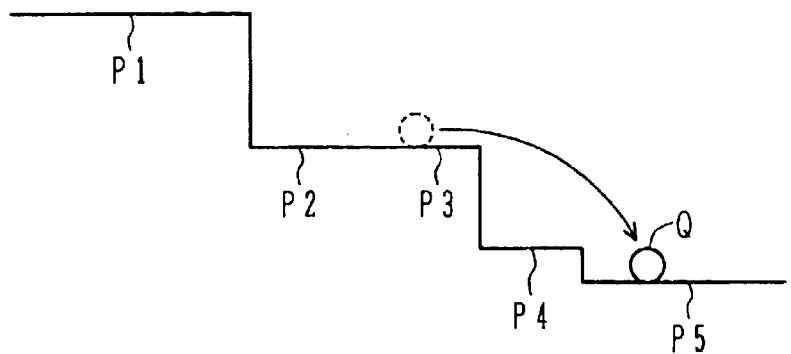

Next, as the signals C2 and φ1 are changed to a higher positive potential, as shown in FIG. 11D the charges in the regions at the potentials P2 and P3 are moved via the region at the potential P4 to the horizontal charge transfer path 6 at the potential P5.

The vertical charge transfer paths 3-1 and 3-2 operate in a manner similar to the operation of the vertical charge transfer paths 3-3 and 3-4. However, since the charges in the vertical charge transfer paths 3-1 and 3-2 are already transferred and the vertical charge transfer paths 3-1 and 3-2 are empty, the charges only in the vertical charge transfer paths 3-3 and 3-4 are substantially transferred to the horizontal charge transfer path 6.

The p-type region 37 is not necessarily required to be formed in the vertical charge transfer path 3. It is not limited that the same signal C1 is applied to the electrodes 32 and 33 shown in FIG. 8. Instead, a signal C1-1 may be applied to the electrode 32, and a different signal C1-2 may be applied to the electrode 33. In this case, if the signals C1-1 and C1-2 are supplied at different timings, the charges can be transferred more smoothly. If the same signal C1 is applied to the electrodes 32 and 33, a single electrode may be used in common for the electrodes 32 and 33.

In the above embodiment, a solid state image pickup device is used which has photoelectric conversion elements disposed on a two-dimensional plane uniformly in vertical and horizontal directions. A solid state image pickup device of a honeycomb structure to be described below may also be used.

Figure 12:
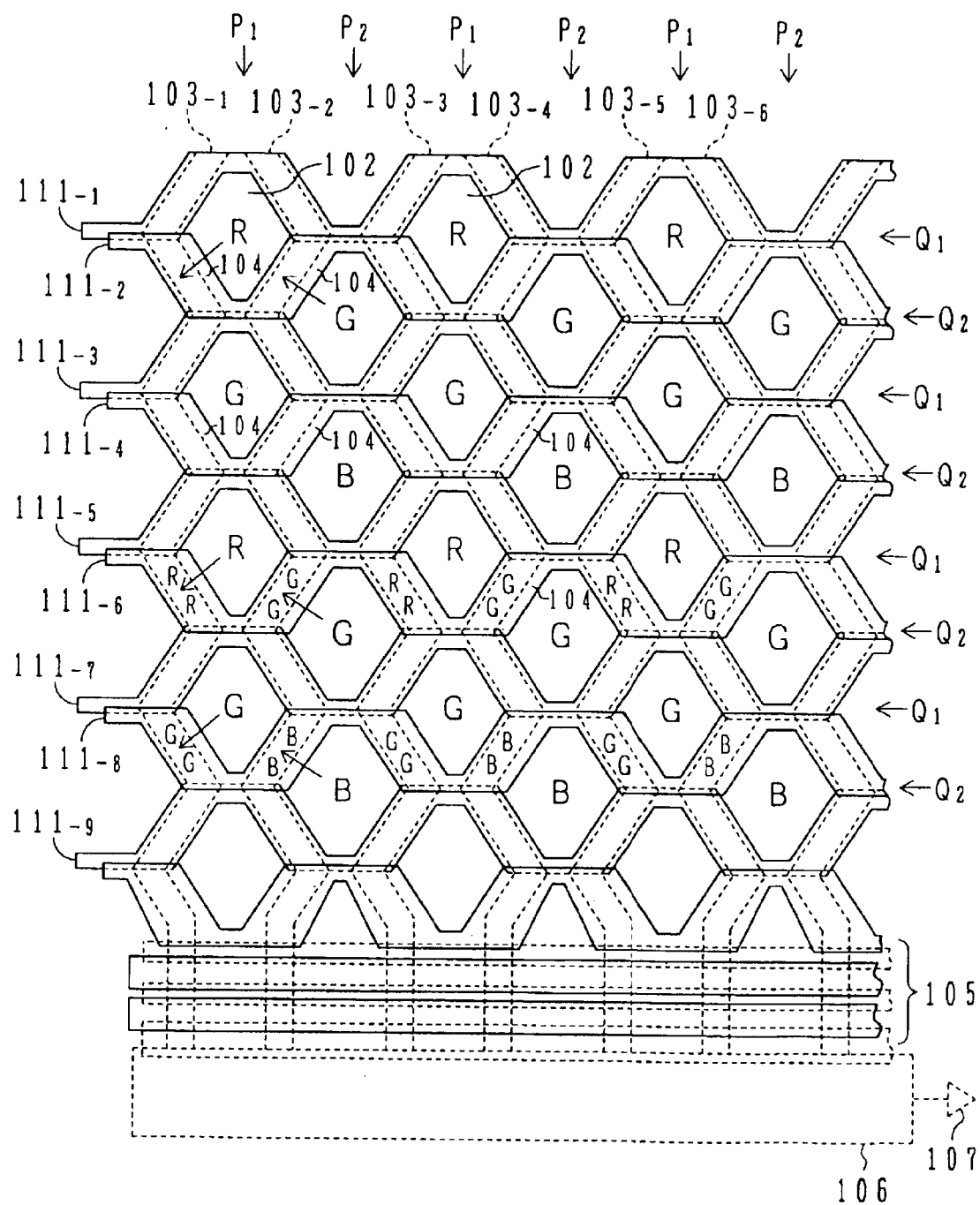
FIG. 12 is a partial plan view of a color solid state image pickup device of a honeycomb structure according to another embodiment of the invention.

FIG. 12 is a partial plan view of a solid state image pickup device of a honeycomb structure. The solid state image pickup device of a honeycomb structure has a number of photoelectric conversion elements 102 disposed at a constant pitch in a plurality of rows and columns. One photoelectric conversion element column P1 or P2 and one photoelectric conversion element row Q1 or Q2 each have a plurality of photoelectric conversion elements 102. Each of the plurality of photoelectric conversion elements 102 constituting an even column P2 is shifted in the column direction by about a half of the pitch between photoelectric conversion elements in the column, relative to each of the plurality of photoelectric conversion elements 102 constituting the odd column P1. Similarly, each of the plurality of photoelectric conversion elements 102 constituting an even row Q2 is shifted in the row direction by about a half of the pitch between photoelectric conversion elements in the row, relative to each of the plurality of photoelectric conversion elements 102 constituting the even row Q1. Each of the photoelectric conversion element columns P1 and P2 includes only the photoelectric conversion elements of either the odd row Q1 or the even row Q2.

In order to transfer red (R), green (G) and blue (B) pixel charges accumulated in the photoelectric conversion elements, a plurality of vertical charge transfer paths 103-1 to 103-6 are formed each between the odd column pixels 102 (R, G, R, G, . . . ) and the even column pixels 102 (G, B, G, B . . . ). Each vertical charge transfer path 103 is disposed in a zigzag way to transfer signal charges along a predetermined direction (to a downstream side).

Each vertical charge transfer path 103 has a plurality of transfer electrodes 111-1 to 111-9. The plurality of transfer electrodes 111 are disposed in a honeycomb shape. Each photoelectric conversion element is disposed in plan in each of hexagonal spaces defined by disposing the plurality of transfer electrode 111 in a honeycomb shape.

The horizontal charge transfer path 106 is made of CCDs, receives electric charges of one row unit transfers charges from the left area of the drawings of FIG. 12 to the right area (in a horizontal direction).

The output amplifier 107 outputs a voltage corresponding to the amount of charges transferred from the horizontal charge transfer path 106.

Control electrodes 105 control the read (transfer) operation of electric charges from the vertical charge transfer path 103 to the horizontal charge transfer path 106.

The charge addition in the vertical and horizontal directions for the solid state image pickup device of this structure can be performed by a control method same as that used for the solid state image pickup device described with FIG. 1A. For example, as a read pulse is applied to the transfer electrode 111-2, charge signals R, G, R, G, . . . are read to the vertical charge transfer path 103 disposed in the horizontal direction and transferred to the vertical charge transfer path 103 under the transfer electrode 111-6. As a read pulse is applied to the transfer electrode 111-6, addition signals RR, GG, RR, GG of two pixels can be obtained. Addition signals GG, BB, GG and BB of two pixels under the transfer electrode 111-8 can be obtained in a similar manner. The signal charge transfer and addition of pixels in the horizontal charge transfer path to be executed thereafter are similar to the operation described with FIG. 1A.

The present invention has been described in connection with the preferred embodiments. The invention is not limited only to the above embodiments. It is apparent that various modifications, improvements, combinations, and the like can be made by those skilled in the art.

What is claimed is:

1. A solid state image pickup device comprising:

a plurality of photoelectric conversion elements for converting light into electric charges, said photoelectric conversion elements being uniformly disposed on a two-dimensional plane in vertical and horizontal directions;

a plurality of vertical charge transfer paths for transferring electric charges to a downstream side in the vertical direction, wherein, for each of said plurality of vertical charge transfer paths, said vertical charge transfer path is disposed adjacent to vertically and uniformly disposed photoelectric conversion elements, wherein each of said plurality of vertical charge transfer paths comprises a plurality of rows;

a read gate for reading electric charges from each photoelectric conversion element to said adjacent vertical charge transfer path;

vertical addition means for adding, for each of said plurality of vertical charge transfer paths, electric charges of two or more photoelectric conversion elements on said adjacent vertical charge transfer path, by controlling said read gates and said vertical charge transfer path to read electric charges from a first subset of said plurality of photoelectric conversion elements to said adjacent vertical charge transfer path, to transfer the read electric charges on said adjacent vertical charge transfer path to the downstream side in the vertical direction, and to read electric charges from a second subset of said plurality of photoelectric conversion elements to said adjacent vertical charge transfer path;

a horizontal charge transfer path for transferring electric charges to a downstream side in the horizontal direction, said horizontal charge transfer path being disposed adjacent to a charge transferring end of each of said plurality of vertical charge transfer paths;

a transfer gate for selectively transferring electric charges of said plurality of vertical charge transfer paths to said horizontal charge transfer path; and horizontal addition means for adding electric charges transferred from two or more of said plurality of vertical charge transfer paths, on said horizontal charge transfer path, by controlling said transfer gate and said horizontal charge transfer path to selectively transfer electric charges from a first row of each of a first subset of said plurality of vertical charge transfer paths to said horizontal charge transfer path, transfer the electric charges on said horizontal charge transfer path to the downstream side of the horizontal path in the horizontal direction, and transfer electric charges from the first row of each of a second subset of said plurality of vertical charge transfer paths on the downstream side to said horizontal charge transfer path, wherein a first number of said plurality of vertical charge transfer paths included in said first subset of said plurality of vertical charge transfer paths is greater than zero, and a second number of said plurality of vertical charge transfer paths included in said second subset of said plurality of vertical charge transfer paths is greater than zero.

2. A solid state image pickup device according to claim 1, wherein said plurality of photoelectric conversion elements can convert light of each of a plurality of colors into electric charges and said vertical charge transfer path and said horizontal charge transfer path adds electric charges of a same color.

3. A solid state image pickup device according to claim 2, wherein:

said plurality of photoelectric conversion elements uniformly disposed in the vertical direction can convert light of each of at least two colors into electric charges; and said vertical addition means adds electric charges of a same color by controlling said read gate and said vertical charge transfer path to read electric charges from some of said plurality of photoelectric conversion elements uniformly disposed in the vertical direction to said vertical charge transfer path by a first read operation, thereafter transfer the read electric charges in the vertical direction to positions adjacent to others of said plurality of photoelectric conversion elements on the downstream side capable of converting light of the same color not read by the first read operation into electric charges, and read the electric charges from the others of said plurality of photoelectric conversion elements by a second read operation to add the read electric charges to the electric charges transferred to the positions.

4. A solid state image pickup device according to claim 3, wherein said photoelectric conversion elements from which the electric charges are read by the second read operation are spaced at least by one photoelectric conversion element in the vertical direction toward said horizontal charge transfer path, from said photoelectric conversion elements from which the electric charges are read by the first read operation.

5. A solid state image pickup device according to claim 1, wherein said transfer gate includes a plurality of control gates extending in parallel in the horizontal direction for controlling the transfer of electric charges from said first subset of said plurality of vertical charge transfer paths differently from the transfer of electric charges from said second subset of said plurality of vertical charge transfer paths, said plurality of control gates crossing said plurality of vertical charge transfer paths.

6. A solid state image pickup device according to claim 5, wherein said plurality of control gates include a control gate which covers areas different in the vertical direction of one and another of said plurality of vertical charge transfer paths.

7. A solid state image pickup device according to claim 5, wherein said plurality of control gates include a control gate which covers areas different in the vertical direction of one and another set of a plurality of vertical charge transfer paths adjacent in the horizontal direction.

8. A solid state image pickup device according to claim 5, wherein said control gates includes a plurality of first and second layer polysilicon electrodes formed above said vertical charge transfer paths.

9. A solid state image pickup device according to claim 8, wherein said plurality of second layer polysilicon electrodes include a second layer polysilicon electrode formed only above said first layer polysilicon electrode above some of said plurality of vertical charge transfer paths.

10. A solid state image pickup device according to claim 8, wherein said plurality of first layer polysilicon electrodes include a first layer polysilicon electrode having different lengths in the vertical direction above different ones of said plurality of vertical charge transfer paths.

11. A solid state image pickup device according to claim 1, wherein said vertical charge transfer path includes a first conductivity type semiconductor layer for transferring electric charges accumulated in said photoelectric conversion element, a first vertical charge transfer path having second conductivity type semiconductor layers in said first conductivity type semiconductor layer for forming a potential barrier in two regions different in the vertical direction, and a second vertical charge transfer path having a second conductivity type semiconductor layer in said first conductivity type semiconductor layer for forming a potential barrier in one of the two regions on a downstream side;

said transfer gate includes at least first to fourth control gates remoter in this order from said horizontal charge transfer path, said first to fourth control gates extending in the horizontal direction above said plurality of vertical charge transfer paths;

said first and third control gates are formed above said first conductivity type semiconductor layer; and said second and fourth control electrodes cross said first and second vertical charge transfer paths in the two regions.

12. A solid state image pickup device according to claim 11, wherein said second and third control electrodes are connected in common.

13. A control method for a solid state image pickup device having a plurality of photoelectric conversion elements for converting light into electric charges, the photoelectric conversion elements being uniformly disposed on a two-dimensional plane in vertical and horizontal directions, a plurality of vertical charge transfer paths for transferring electric charges to a downstream side in the vertical direction, each of the plurality of vertical charge transfer paths being disposed adjacent to a plurality of vertically and uniformly disposed photoelectric conversion elements, wherein each of the plurality of vertical charge transfer paths comprises a plurality of rows, the plurality of rows including a first row, a horizontal charge transfer path for transferring electric charges to a downstream side in the horizontal direction, the horizontal charge transfer path being disposed so as to receive electric charges from the first row of each of the plurality of vertical charge transfer paths, the method comprising the steps of:

(a) reading electric charges from a first subset of the plurality of photoelectric conversion elements to the adjacent vertical charge transfer path;

(b) transferring the electric charges read in step (a) on the vertical charge transfer path to a downstream side in the vertical direction;

(c) reading electric charges from a second subset of the plurality of photoelectric conversion elements to the adjacent vertical charge transfer path and adding the electric charges in the second subset of the plurality of photoelectric conversion elements to the electric charges in the first subset of the plurality of photoelectric conversion elements to generate a plurality of combined electric charges in the adjacent vertical charge transfer path;

(d) transferring each combined electric charge positioned in the first row for each of a first subset of the plurality of vertical charge transfer paths to the horizontal charge transfer path, wherein the first subset of the plurality of vertical charge transfer paths includes a number of vertical charge transfer paths that is greater than zero;

(e) transferring the combined electric charges transferred in step (d) on the horizontal charge transfer path to a downstream side in the horizontal direction; and (f) transferring each combined electric charge positioned in the first row for each of a second subset of the plurality of vertical charge transfer paths to the horizontal charge transfer path and adding the combined electric charges transferred from the second subset of the plurality of vertical charge transfer paths to the combined electric charges transferred from the first subset of the plurality of vertical charge transfer paths, wherein the second subset of vertical charge transfer paths includes a number of vertical charge transfer paths that is greater than zero.

14. A control method for a solid state image pickup device according to claim 13, wherein the plurality of photoelectric conversion elements can convert light of each of a plurality of colors into electric charges and said steps (c) and (f) adds electric charges of a same color.

15. A control method for a solid state image pickup device according to claim 13, wherein:

the plurality of photoelectric conversion elements uniformly disposed in the vertical direction can convert light of each of at least two colors into electric charges;

said step (b) transfers the read electric charges in the vertical direction to positions adjacent to others of the plurality of photoelectric conversion elements on the downstream side capable of converting light of the same color not read by said step (a) into electric charges; and said step (c) reads the electric charges from the others of the plurality of photoelectric conversion elements on the downstream side to add the read electric charges to the electric charges transferred to the positions.

16. A control method for a solid state image pickup device according to claim 13, wherein:

said step (d) transfers added electric charges of a same color from some of the plurality of vertical charge transfer paths to the horizontal charge transfer path; and said step (f) transfers electric charges of the same color from others of the plurality of vertical charge transfer paths on the downstream side to the horizontal charge transfer path and adding the electric charges of the same color transferred from two or more vertical charge transfer paths.

17. A solid state image pickup device comprising:

a plurality of photoelectric conversion elements for converting light into electric charges, said photoelectric conversion elements being uniformly disposed on a two-dimensional plane in vertical and horizontal directions;

a plurality of vertical charge transfer paths for transferring electric charges to a downstream side in the vertical direction, said vertical charge transfer path being disposed adjacent to vertically and uniformly disposed photoelectric conversion elements, wherein each of said vertical charge transfer paths include a first region of a first conductivity type for transferring electric charges accumulated in said photoelectric conversion element, and said vertical charge transfer paths include a first vertical charge transfer path having second regions added with impurities of a second conductivity type in said first region for forming a potential barrier in two regions different in the vertical direction, and a second vertical charge transfer path having a second region added with impurities of said second conductivity type in said first region for forming a potential barrier in a region corresponding to one of the two regions on a downstream side;

a read gate for reading electric charges from each photoelectric conversion element to said adjacent vertical charge transfer path;

vertical addition means for adding electric charges of two or more photoelectric conversion elements on said vertical charge transfer path, by controlling said read gates and said vertical charge transfer path to read electric charges from some of said plurality of photoelectric conversion elements to said vertical charge transfer path, transfer the read electric charges on said vertical charge transfer path to the downstream side in the vertical direction, and read electric charges from others of said plurality of photoelectric elements on the downstream side to said vertical charge transfer path;

a horizontal charge transfer path for transferring electric charges to a downstream side in the horizontal direction, said horizontal charge transfer path being disposed adjacent to one ends of said plurality of vertical charge transfer paths;

a transfer gate for transferring electric charges of said vertical charge transfer paths to said horizontal charge transfer path, wherein said transfer gate includes at least first to fourth control gates remoter in this order from said horizontal charge transfer path, said first to fourth control gates extending in the horizontal direction above said plurality of vertical charge transfer paths, wherein said first and third control gates are formed above said first region, and said second and fourth control electrodes cross said first and second vertical charge transfer paths in the two regions; and horizontal addition means for adding electric charges transferred from two or more of said vertical charge transfer paths, on said horizontal charge transfer path, by controlling said transfer gate and said horizontal charge transfer path to transfer electric charges from some of said plurality of vertical charge transfer paths to said horizontal charge transfer path, transfer the electric charges on said horizontal charge transfer path to the downstream side in the horizontal direction, and transfer electric charges from others of said plurality of vertical charge transfer paths on the downstream side to said horizontal charge transfer path.

18. A solid state image pickup device according to claim 17, wherein said second and third control electrodes are connected in common.

19. A solid state image pickup device, comprising:

a plurality of photoelectric conversion elements;

a plurality of vertical charge transfer paths, each of which comprises a plurality of rows, the plurality of rows including a first row, wherein each of the plurality of photoelectric conversion elements is coupled to a corresponding one of the plurality of vertical charge transfer paths, and each of the plurality of photoelectric conversion elements converts light into an electric charge and selectively transfers the electric charge to the corresponding one of the plurality of vertical charge transfer paths via a read gate;

at least one controller which generates a first combined electric charge and a second combined electric charge within each of the plurality of vertical charge transfer paths by selectively transferring a first electric charge and a second electric charge to their corresponding one of the vertical charge transfer paths, moving the first electric charge and the second electric charge in a predetermined direction within the corresponding one of the vertical charge transfer paths, and adding a third electric charge and a fourth electric charge to the first electric charge and the second electric charge, respectively, to generate the first combined electric charge and the second combined electric charge, respectively; and a horizontal charge transfer path, wherein a charge transfer end corresponding to the first row of each of the plurality of vertical charge transfer paths is coupled to the horizontal charge transfer path, wherein each of the first combined electric charges in the plurality of vertical charge transfer paths is positioned in the first row of the corresponding one of the plurality of vertical charge transfer paths, wherein the at least one controller further generates a third combined electric charge and a fourth combined electric charge within the horizontal charge transfer path by selectively transferring the first combined electric charge for a first one of the plurality of vertical charge transfer paths and the first combined electric charge for a second one of the plurality of vertical charge transfer paths to the horizontal charge transfer path, moving the first combined electric charge for the first one of the plurality of vertical charge transfer paths and the first combined electric charge for the second one of the plurality of vertical charge transfer paths in a predetermined direction within the horizontal charge transfer path, and adding the first combined electric charge for a third one of the plurality of vertical charge transfer paths and the first combined electric charge for a fourth one of the plurality of vertical charge transfer paths to the first combined electric charge for the first one of the plurality of vertical charge transfer paths and the first combined electric charge for the second one of the plurality of vertical charge transfer paths, respectively, to generate the third combined electric charge and the fourth combined electric charge, respectively.

20. The solid state image pickup device according to claim 19, wherein the at least one controller further generates a fifth combined electric charge and a sixth combined electric charge within the horizontal charge transfer path by selectively transferring the second combined electric charge for the first one of the plurality of vertical charge transfer paths and the second combined electric charge for the second one of the plurality of vertical charge transfer paths to the horizontal charge transfer path, moving the second combined electric charge for the first one of the plurality of vertical charge transfer paths and the second combined electric charge for the second one of the plurality of vertical charge transfer paths in the predetermined direction within the horizontal charge transfer path, and adding the second combined electric charge for the third one of the plurality of vertical charge transfer paths and the second combined electric charge for the fourth one of the plurality of vertical charge transfer paths to the second combined electric charge for first one of the plurality of vertical charge transfer paths and the second combined electric charge for the second one of the plurality of vertical charge transfer paths, respectively, to generate the fifth combined electric charge and the sixth combined electric charge, respectively.

* * * * *